US012577057B2

(12) United States Patent
Raikar et al.

(10) Patent No.: US 12,577,057 B2
(45) Date of Patent: Mar. 17, 2026

(54) VERTICALLY ADJUSTABLE SORTATION DEVICES AND SYSTEMS

(71) Applicant: INTELLIGRATED HEADQUARTERS, LLC, Mason, OH (US)

(72) Inventors: Venkatesh Raikar, Charlotte, NC (US); Saravanan Sadasivan, Charlotte, NC (US); Ravi Kumar Avupati, Charlotte, NC (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 16 days.

(21) Appl. No.: 18/171,980

(22) Filed: Feb. 21, 2023

(65) Prior Publication Data

US 2023/0264900 A1 Aug. 24, 2023

(30) Foreign Application Priority Data

Feb. 21, 2022 (IN) .............................. 202211008947

(51) Int. Cl.
| | |
|---|---|
| *B65G 41/00* | (2006.01) |
| *B65G 11/12* | (2006.01) |
| *B65G 47/68* | (2006.01) |

(52) U.S. Cl.
CPC .......... *B65G 41/005* (2013.01); *B65G 11/123* (2013.01); *B65G 47/683* (2013.01)

(58) Field of Classification Search
None
See application file for complete search history.

(56) References Cited

U.S. PATENT DOCUMENTS

| | | | | | |
|---|---|---|---|---|---|
| 4,148,391 | A | * | 4/1979 | Stobb | ..................... B65G 47/54 |
| | | | | | 198/531 |
| 5,205,400 | A | * | 4/1993 | Breuss | ................... B65G 15/00 |
| | | | | | 198/816 |

(Continued)

FOREIGN PATENT DOCUMENTS

| | | |
|---|---|---|
| CN | 107055121 A | 8/2017 |
| CN | 112110174 A | 12/2020 |

(Continued)

OTHER PUBLICATIONS

European search report Mailed on Nov. 23, 2023 for EP Application No. 23157651, 11 page(s).

(Continued)

*Primary Examiner* — Kavel Singh
(74) *Attorney, Agent, or Firm* — Alston & Bird LLP

(57) ABSTRACT

Devices and systems are provided for improved article sortation. An example sortation device includes a height adjustable frame and a sortation table movably attached to the height adjustable frame. The sortation table defines a first end, a second end opposite the first end, and a body extending therebetween. The body defines a first surface that supports an article thereon where a location of the body between the first end and the second end pivotally attaches the sortation table with the height adjustable frame. The sortation device performs a tilt operation in which the sortation table rotates about the pivotal attachment between the second end and the height adjustable frame so as to convey the article supported by the sortation table. The height adjustable frame adjusts a vertical position of the sortation table so as to modify a vertical position at which the article is conveyed.

17 Claims, 10 Drawing Sheets

(56) References Cited

U.S. PATENT DOCUMENTS

| | | | | |
|---|---|---|---|---|
| 6,460,681 | B1 * | 10/2002 | Coutant | B65G 47/965 |
| | | | | 209/912 |
| 7,478,071 | B2 | 1/2009 | Kadambe | |
| 9,962,743 | B2 * | 5/2018 | Bombaugh | B07C 3/08 |
| 10,556,253 | B2 * | 2/2020 | Khan | B07C 3/006 |
| 10,843,876 | B2 * | 11/2020 | Dugat | B65G 47/71 |
| 10,974,913 | B1 | 4/2021 | Nussbaum | |
| 11,001,451 | B2 * | 5/2021 | Gagné | B65G 15/30 |
| 11,001,454 | B2 * | 5/2021 | Becher | B65G 47/5104 |
| 11,267,660 | B2 * | 3/2022 | Hoag | B65G 47/962 |
| 11,485,587 | B2 * | 11/2022 | Becher | B65G 47/57 |
| 2003/0042330 | A1 | 3/2003 | Streutker et al. | |
| 2009/0159396 | A1 | 6/2009 | Wood | |
| 2020/0017319 | A1 | 1/2020 | He | |
| 2020/0086354 | A1 | 3/2020 | Becher et al. | |
| 2020/0087080 | A1 | 3/2020 | Becher et al. | |

FOREIGN PATENT DOCUMENTS

| | | | | | |
|---|---|---|---|---|---|
| CN | 113441406 | A | | 9/2021 | |
| CN | 214454306 | U | | 10/2021 | |
| GB | 2197633 | A | * | 5/1988 | B65G 17/345 |
| WO | 2015/036255 | A1 | | 3/2015 | |

OTHER PUBLICATIONS

Communication about intention to grant a European patent Mailed on Feb. 10, 2025 for EP Application No. 23157651, 6 page(s).

Decision to grant a European patent Mailed on Jun. 13, 2025 for EP Application No. 23157651, 2 page(s).

CN Office Action Mailed on Jan. 7, 2026 for CN Application No. 202310145001, 8 page(s).

CN Search report Mailed on Jan. 7, 2026 for CN Application No. 202310145001, 2 page(s).

English Translation of CN Office Action dated Jan. 7, 2026 for CN Application No. 202310145001, 8 page(s).

* cited by examiner

VERTICALLY ADJUSTABLE SORTATION DEVICES AND SYSTEMS

CROSS-REFERENCE TO RELATED APPLICATIONS

This application claims priority pursuant to 35 U.S.C. 119(a) to Indian Application No. 202211008947, filed Feb. 21, 2022, which application is incorporated herein by reference in its entirety.

TECHNOLOGICAL FIELD

Example embodiments of the present disclosure relate generally to fulfillment and conveyor systems and, more particularly, to devices and systems for improved article sortation.

BACKGROUND

Warehouses, distribution centers, and other material handling environments often rely on a number of components, systems, and the like for transporting and sorting articles, items, products, etc. within these environments. In some instances, one or more conveyors, conveyor segments, chutes, induction systems, system merges, and/or the like are used in order to sort or otherwise position articles within the material handling environments. The inventors have identified numerous deficiencies with these existing technologies in the field, the remedies for which are the subject of the embodiments described herein.

BRIEF SUMMARY

Devices and systems are provided for improved article sortation. An example sortation device may include an adjustable frame and a sortation table movably attached to the adjustable frame. The sortation table may define a first end, a second end opposite the first end, and a body extending therebetween. The body may define a first surface configured to support an article thereon where a location of the body between the first end and the second end may be configured to pivotally attach the sortation table with the adjustable frame. The sortation device may be configured to perform a tilt operation in which the sortation table rotates about the pivotal attachment between the sortation table and the adjustable frame so as to convey the article supported by the sortation table. The adjustable frame may be configured to adjust a vertical position of the sortation table so as to modify a vertical position at which the article is conveyed.

In some embodiments, the location of the body at which the sortation table is pivotally attached to the adjustable frame may be substantially equidistance from the first end and the second end or supported by a hinge mechanism defining a plurality of linkages configured to facilitate the rotation of the sortation table about the height adjustable frame.

In some embodiments, the tilt operation in which the sortation table rotates about the pivotal attachment between the sortation table and the adjustable frame may be in a first direction such that an angle between the first end and the adjustable frame decreases and an angle between the second end and the adjustable frame increases.

In some embodiments, the tilt operation in which the sortation table rotates about the pivotal attachment between the sortation table and the adjustable frame may be in a second direction is such that an angle between the first end and the adjustable frame increases and an angle between the second end and the adjustable frame decreases.

In some embodiments, the sortation device may further include a rotation mechanism operably coupled with the sortation table and configured to cause rotation of the sortation table about the pivotal connection with the adjustable frame so as to perform the tilt operation.

In some embodiments, the sortation device may further include one or more rollers supported by the body of the sortation table, the one or more rollers configured to translate the article relative the first surface of the body.

In some further embodiments, the one or more rollers may be configured to move between a retracted position in which the one or more rollers are at least partially stored within the body of the sortation table and an extended position wherein at least a portion of the one or more rollers extends beyond the first surface of the body so as to contact the article supported thereon.

In other embodiments, the sortation device may further include one or more conveyors coupled with the first surface of the body that may receive the article translated by the one or more rollers.

In some embodiments, at least a portion of the first end or the second end may be configured to move between an extended position and a retracted position so as to modify a length of the body measured between the first end and the second end.

In some embodiments, the adjustable frame may be configured to be operably coupled with a first chute proximate the adjustable frame and the first end of the sortation table where the first chute may be located at a first vertical position. In such an embodiment, the adjustable frame may be configured to move the sortation table vertically so as to provide the article to the first chute via the tilt operation at the first vertical position.

In some further embodiments, the tilt operation in which the sortation table rotates about the pivotal attachment between the sortation table and the adjustable frame may be in a first direction such that a first angle between the first end and the adjustable frame decreases.

In some embodiments, the adjustable frame may be configured to be operably coupled with a first chute proximate the adjustable frame and the first end of the sortation table located at a first vertical position and a second chute proximate the adjustable frame and the first end of the sortation table located at a second vertical position. In such an embodiment, the adjustable frame may be configured to move the sortation table vertically so as to provide the article to either the first chute or the second chute via the tilt operation.

In some further embodiments, the tilt operation in which the sortation table rotates about the pivotal attachment between the sortation table and the adjustable frame may be in a first direction such that a first angle between the first end and the adjustable frame is formed so as to provide the article to the first chute via the tilt operation or a second angle between the first end and the adjustable frame is formed so as to provide the article to the second chute via the tilt operation.

In other embodiments, at least a portion of the first end or the second end may be configured to move between an extended position and a retracted position so as to modify a length of the body measured between the first end and the second end so as to provide the article to either the first chute or the second chute.

In some further embodiments, the adjustable frame may be configured to be operably coupled with a third chute proximate the adjustable frame and the second end of the sortation table located at a third vertical position and a fourth chute proximate the adjustable frame and the second end of the sortation table located at a fourth vertical position. In such an embodiment, the adjustable frame may be configured to move the sortation table vertically so as to provide the article to either the third chute or the fourth chute via the tilt operation.

In some embodiments, the sortation device may further include a controller operably coupled with the adjustable frame and the sortation table. The controller may be configured to control the vertical movement of the adjustable frame and the tilt operation of the sortation table.

In some further embodiments, the controller may be further configured to control the tilt operation of the sortation table based upon one or more characteristics of the article.

In some embodiments, the adjustable frame may include a plurality of sequentially nested sections.

In some embodiments, the adjustable frame may include a hydraulic or a pneumatic drive mechanism configured to cause vertical movement of the adjustable frame.

In some embodiments, the sortation table may be configured to, following performance of a tilt operation, revert to a resting position that is substantially perpendicular with respect to the vertical movement of the adjustable frame.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figures 1, 1A:
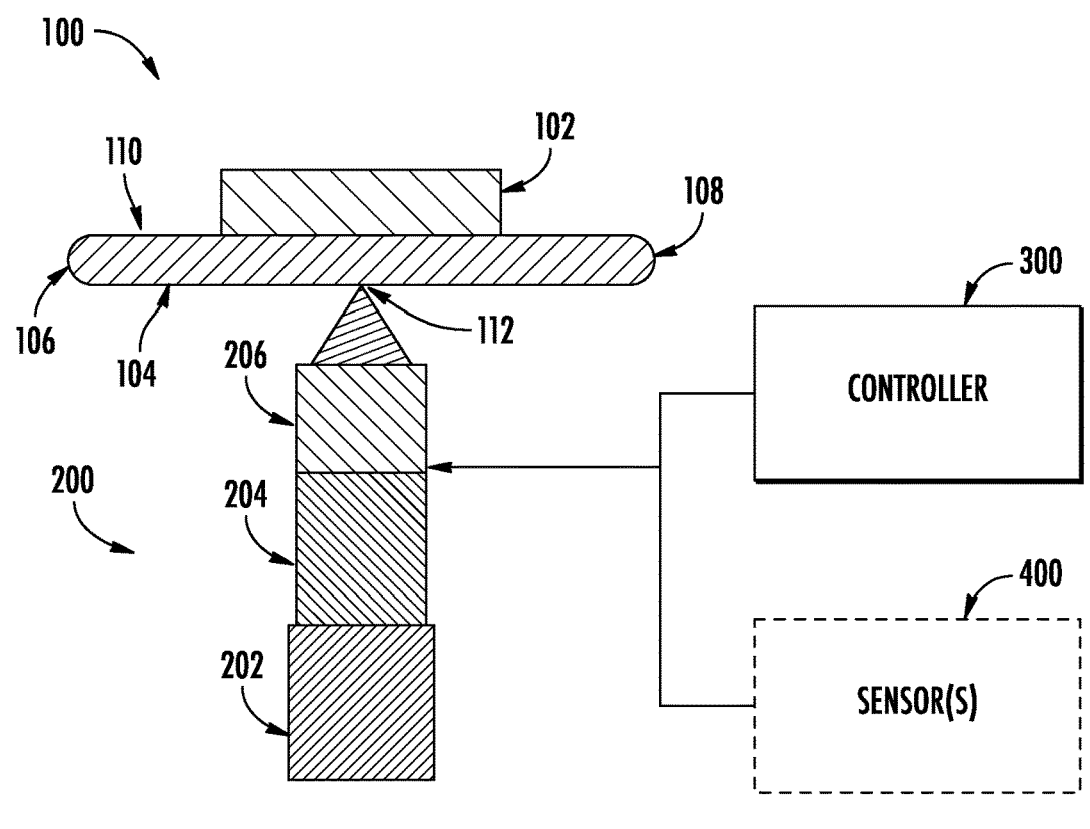
FIG. 1 illustrates an example sortation device of the present disclosure in accordance with some example embodiments described herein.
FIG. 1A illustrates an example hinge mechanism for use with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As described hereinafter, movement of one or more elements of the example sortation systems of the present disclosure may be described with reference to a "first direction," "second direction," and/or the like. For the sake of clarity of description, the embodiments of the present disclosure describe a first direction that refers to a counterclockwise rotational movement of, for example, a sortation table about an adjustable frame. Similarly, the embodiments of the present disclosure describe a second direction that refers to a clockwise rotational movement of, for example, a sortation table about an adjustable frame. In other words, the first direction and the second direction refer to the rotational direction of the described element as viewed in the illustrated figures. As would be evident to one of ordinary skill in the art in light of the present disclosure, the rotational direction (e.g., the first direction and/or the second direction) may vary based upon the frame of reference of the example sortation system and devices. The present disclosure, however, contemplates that the described first direction and second direction may encompass any rotational direction required to complete the intended operation of the element described in conjunction with the respective direction.

Overview

As noted above, traditional warehouses and distribution centers may rely upon a collection of connected conveyors to transport containers throughout these material handling environments. In some instances, these conveyors may be configured to sort or direct products from one conveyor to another. Furthermore, these conveyor systems may integrate induction devices, system merges, sortation diverts, and/or the like in order to ensure that articles (e.g., containers, packages, etc.) are properly sorted and that orders are ultimately fulfilled. In conventional systems, however, each type of sortation operation is completed by an individual or distinct device or system. By way of example, in order to transfer an article between adjacent conveyors a tilt tray that is specifically designed for the particular direction of transfer is required (e.g., in order to transfer an article to another direction, another distinct tilt tray is required). As such, these conventional systems require a plurality of interconnected transfer or sortation devices in order to accomplish the various sortation operations of a particular system thereby increasing the size of the overall system while simultaneously reducing throughput.

To solve these issues and others, example implementations of embodiments of the present disclosure may provide an integrated, multi-directional sortation device configured to transfer articles to a plurality of locations at varying vertical positions with a single device. Unlike the rigidity provided by conventional systems, embodiments described herein may include a sortation table configured to perform tilt operations for transferring articles to a plurality locations in conjunction with an adjustable frame for simultaneously adjusting the vertical position at which the tilt operation occurs. Furthermore, the embodiments described herein may employ one or more rollers (e.g., pop-up rollers or the like) to provide further transfer capabilities by repositioning articles supported by the sortation devices. The embodiments described herein may not only operate as a standalone improvement (e.g., a new sortation system independently moveable relative a conveyor system) but may further operate as an improvement to existing conveyor systems (e.g., a retrofit design that improves current implementations). In doing so, such example embodiments operate to provide an integrated, multi-directional sortation device and system that reliably increase the throughput of conveyor networks and fulfillment environments resulting in improved system efficiencies.

Sortation Devices and System

With reference to FIG. 1, an example sortation device 100 (e.g., device 100) of the present disclosure is illustrated. As shown, the device 100 may include an adjustable frame 200 (e.g., a height adjustable frame 200) and a sortation table 104 movably attached to the adjustable frame 200. The sortation table 104 and the adjustable frame 200 may, alone or collectively, operate to transfer or otherwise sort an article 102. The sortation device embodiments of the present disclosure may be implemented as part of a sortation system, as shown in FIGS. 7-10, in which a plurality of conveyors, conveyor segments, chutes, induction systems, system merges, and/or the like are operable coupled with the sortation device 100. Furthermore, the present disclosure contemplates that the sortation device 100 may include any number of sortation devices described hereafter, based upon the intended application of the device 100. Alternatively, in some embodiments, a single sortation device may be used. Said differently, the present disclosure contemplates that the sortation devices described herein also provide independent multi-directional sortation with vertical positioning not found in conventional solutions (e.g., as a standalone sortation device and in conjunction with other sortation devices so as to form a sortation system).

Any of the sortation devices and sortation systems of the present disclosure, such as device 100 of FIG. 1, may include a controller 300 operably connected with one or more elements of the device 100. As described hereafter, the sortation device 100 may include various adjustable components (e.g., a rotation mechanism, one or more rollers, etc.) that may be controlled at least in part by the controller 300. As such, the controller 300 may include circuitry, networked processors, or the like configured to perform some, or all of the sortation-based processes described herein and may be any suitable processing device and/or network server. In this regard, the controller 300 may be embodied by any of a variety of devices. For example, the controller 300 may be configured to receive/transmit data (e.g., positional data, sensor data, etc.) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, Internet of Things (IoT) device, or in some embodiments, a peripheral device that connects to one or more fixed or mobile terminals. The controller 300 may, in some embodiments, comprise several servers or computing devices performing interconnected and/or distributed functions. Despite the many arrangements contemplated herein, the controller 300 is shown and described herein as a single computing device to avoid unnecessarily overcomplicating the disclosure.

In some instances, the controller 300 may be operably coupled with the sortation device 100, the adjustable frame 200, and/or the sortation table 104 via a network. By way of example, the controller 300 may be associated with a central management system or central computing device configured to, in whole or in part, transmit instructions to or control operation of the device 100 or at least a portion thereof. In such an embodiment, the network may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network may include a public network, such as the Internet, a private network, such as an intranet, or combinations thereof, and may utilize a variety of networking protocols now available or later developed including, but not limited to TCP/IP based networking protocols. In some embodiments, the network may refer to a collection of wired connections such that the sortation device 100, the adjustable frame 200, the sortation table 104, and/or the controller 300 may be physically connected, via one or more networking cables or the like.

The controller 300 may include a processor, a memory, input/output circuitry, and/or communications circuitry. Although these components may be described in some cases using functional language, it should be understood that the particular implementations necessarily include the use of particular hardware. It should also be understood that certain of these components may include similar or common hardware. For example, two sets of circuitry may both leverage use of the same processor, memory, communications circuitry, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the controller 300 may be housed within components of the sortation device 100. It will be understood in this regard that some of the components described in connection with the controller 300 may be housed within one or more of the devices of FIGS. 1-10, while other components are housed within another of these devices, or by yet another device not expressly illustrated in FIGS. 1-10.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the controller 300 may provide or supplement the functionality of particular circuitry. By way of example, the processor (and/or co-processor or any other processing circuitry assisting or otherwise associated with the processor) may be in communication with the memory via a bus for passing information among components of the controller 300. The memory may be non-transitory and may include, for example, one or more volatile and/or non-volatile memories. In other words, for example, the memory may be an electronic storage device (e.g., a non-transitory computer readable storage medium). The memory may be configured to store information, data, content, applications, instructions, or the like, for enabling the controller 300 to carry out various functions in accordance with example embodiments of the present disclosure.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of controller 300.

With continued reference to FIG. 1, in some embodiments, the sortation device 100 may include one or more sensors 400. By way of example, the sensor(s) 400 may include any element configured to generate data that is indicative of a characteristic of the device 100. For example, the sensor(s) 400 may include one or more positional sensors configure to determine the position of one or more elements of the device 100 (e.g., a current position of a sortation table and/or the adjustable frame as described hereafter). Additionally or alternatively, the sensor(s) 400 may include one or more contact or proximity sensors configure to detect actual or imminent contact between one or more elements of the device 100 (e.g., so as to prevent unintended contact between, for example, the sortation table 104 and a chute). Additionally, the sensor(s) 400 may include one or more cameras, scanners, or the like configured to, for example, scan readable indicia of an example article sorted by the device 100. By way of a more particular example, a barcode scanner or equivalent mechanism may scan a barcode (e.g., readable indicia) attached to or defined by an article received by the device 100. The data generated by the sensor(s) 400 (e.g., camera, barcode scanner, etc.) may be indicative of one or more characteristics of the article and may further be transmitted to the controller 300 so as to determine the appropriate sortation operation (e.g., tilt operation angle, vertical position, etc. of the device 100). Similarly, one or more sensor(s) 400 may generated data indicative of the number of articles sorted by the device 100, such as indicative of a current or projected operational capacity of the device 100. Although described herein with reference to particular types of sensors and associated operations for using the same, the present disclosure contemplates that the sensor(s) 400 may include one or more sensors of any type, configuration, position, dimensions (e.g., size and shape), etc. without limitation.

Figures 2A, 2B, 2C:
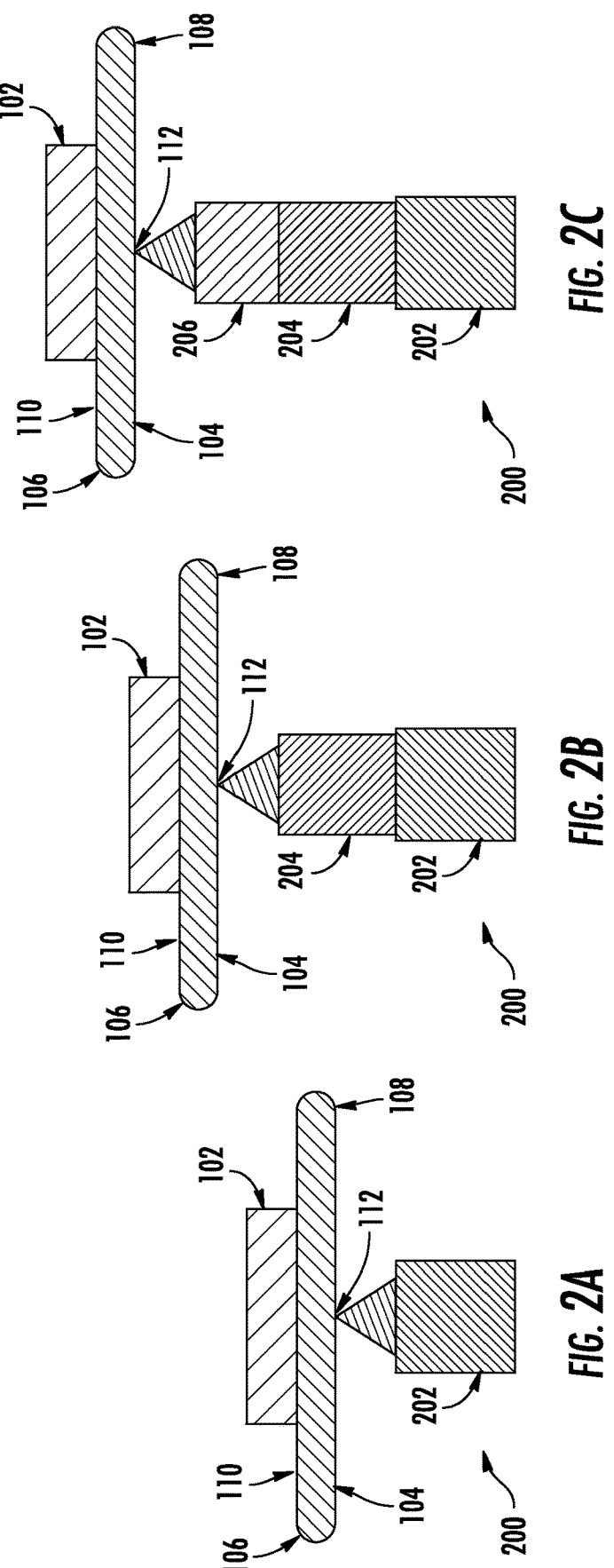
FIGS. 2A-2C illustrate operation of an adjustable frame of the example sortation device of FIG. 1 in accordance with some example embodiments described herein.

With reference to FIGS. 1-2C, the device 100 as shown may include an adjustable frame 200 with which the sortation table 104 may be movably attached. As described herein, the adjustable frame 200 may be configured to modify the vertical position (e.g., height) of the sortation table 104 attached thereto such that the adjustable frame 200 may also be referred to as a height adjustable frame 200. The adjustable frame 200 may be formed of a plurality of sequentially nested sections (e.g., sections 202, 204, 206) that operate to allow vertical adjustment of the adjustable frame 200. For example, the adjustable frame 200 may include a motorized, hydraulic, pneumatic, or other equivalent drive mechanism configured to cause the plurality of nested sections 202, 204, 206 to selectively move between a retracted position and an extended position. Said differently, the adjustable frame 200, via a hydraulic drive mechanism or the like, may cause section 204 to move from a nested position at least partially within section 202 so as to increase the overall height of the adjustable frame 200 resulting in a change (e.g., increase) in the vertical position of the sortation table 104 attached thereto. Although described and illustrated herein with reference to an adjustable frame 200 that includes three (3) nesting sections 202, 204, 206, the present disclosure contemplates that the adjustable frame 200 may include any number of nesting sections 202, 204, 206 based upon the intended application of the sortation device 100. Furthermore, the present disclosure contemplates that the dimensions (e.g., size and shape) of the plurality of sections 202, 204, 206 may vary based upon the intended application of the sortation device 200 (e.g., so as to precisely adjust the vertical position of the sortation table 104). Still further, the present disclosure contemplates that the dimensions (e.g., size and shape) of the plurality of sections 202, 204, 206 may be determined, at least in part, by the corresponding systems (e.g., chutes, conveyors, etc.) with which the sortation device 100 is coupled.

As shown in FIG. 2A, the adjustable frame 200 is illustrated at a first position in which sections 204, 206 are sequentially nested within section 202. As shown in FIG. 2B, the adjustable frame 200 may be positioned at a second position in which section 204 extends from section 202 so as to increase the vertical position (e.g., height) of the sortation table 104 attached thereto. In such a configuration, section 206 may remain nested within section 204. As shown in FIG. 3C, the adjustable frame 200 is illustrated in a third position in which section 206 extends from section 204 so as to further increase the vertical position (e.g., height) of the sortation table 104 attached thereto. As would be evident in light of the present disclosure, the adjustable frame 200 may operate to reduce the vertical position (e.g., height) by, for example, causing section 206 to be nested within section 204 and/or causing section 204 to be nested within section 206. Although described herein with reference to an adjustable frame 200 formed of a plurality of vertically adjustable sections, the present disclosure contemplates that any mechanism for adjusting the vertical position of the sortation table 104 may be included.

With reference to FIGS. 1-5, the sortation device 100 may further include a sortation table 104 movably attached to the adjustable frame 200. The sortation table 104 may define a first end 106, a second end 108 opposite the first end 106, and a body extending therebetween. The body of the sortation table 104 may, as shown, define a rectangular body (e.g., having a rectangular cross-sectional shape) configured to support the article 102 thereon, such as via a first surface 110 of the body. Although illustrated and described herein with reference to a rectangular body (e.g., a body having a rectangular cross-section), the present disclosure contemplates that the size and/or shape of the body of the sortation table 104 may be similarly dimensioned based at least partially upon the dimensions of the article 102 and/or the intended application of the device 100. A location 112 of the body between the first end 106 and the second end 108 may be configured to pivotally attach the sortation table 104 with the adjustable frame 200. As described hereafter, the sortation device 100 maybe is configured to perform a tilt operation in which the sortation table 104 rotates about the pivotal attachment (e.g., at location 112 of the body) between the sortation table 104 and the adjustable frame 200 so as to convey the article 102 supported by the sortation table 104. In any embodiment described herein, the sortation table 104 may be configured to, following performance of a tilt operation as described hereafter, revert to a resting position that is substantially perpendicular with respect to the vertical movement of the adjustable frame 200 as shown in FIGS. 1-2C. Although described herein with reference to a substantially perpendicular resting position, the present disclosure contemplates that the resting position may refer to any position at which the article 102 may be supported by the first surface 110 of the sortation table 104 at the resting position.

In some embodiments, as shown, the location 112 of the body at which the sortation table 104 is pivotally attached to the adjustable frame 200 is substantially equidistance from the first end 106 and the second end 108. In other words, the location 112 may be positioned centrally along the length of the body of the sortation table 104 such that a rotational movement of about the location 112 results in substantially the same angular rotation of the first end 106 and the second end 108. In order to facilitate this rotational movement, the adjustable frame 200 and/or the location 112 of the sortation table 104 may include one or more bearings, bushings, rolling elements, and/or the like to reduce the friction at this pivotal attachment location. As described hereafter with reference to an example tilt operation, the first end 106 and/or the second end 108 may, for example, define an angled, sloped, chamfered, etc. portion configured to reduce or otherwise prevent impingement of the article 102 on the first surface 110 of the body during movement of the article relative the sortation table 104.

The sortation device 104 may further include a rotation mechanism 208 operably coupled with the sortation table 104. The rotation mechanism 208 may be configured to cause rotation of the sortation table 104 about the location 112 so as to facilitate or otherwise cause a tilt operation associated with the sortation table 104 as described hereafter. The rotation mechanism 208 may be attached to the adjustable frame 200 and, in some embodiments, connected to the sortation table 104 at a central location of the body as described above. By way of example, the rotation mechanism 208 may include one or more motors, gearing systems (e.g., rack and pinion, simple gears, worm gears, etc.), or the like configured to, when powered, cause rotation of the sortation table 104 in either a first direction (e.g., a counterclockwise direction) or a second direction (e.g., a clockwise direction) to perform a tilt operation. In some embodiments, the rotation mechanism 208 may be operably coupled with the controller 300 such that the controller 300 may control operation thereof. By way of example, the rotation mechanism 208 may receive instructions from the controller 300 that cause the rotation mechanism 208 to output a rotational force at the location 112 of the sortation table 104 to cause rotational movement of the sortation table 104.

Furthermore, although described herein with reference to a pivotal attachment, the present disclosure contemplates that the sortation table 104 may be attached to the adjustable frame 200 (e.g., height adjustable frame 200) via a hinge mechanism 209. As shown in FIG. 1A, for example, one or more linkages 211 of the hinge mechanism 209 may be configured to facilitate rotation of the sortation table 104 about the adjustable frame 200. In other words, the present disclosure contemplates that the movement of the sortation table 104 relative the height adjustable frame 200 may occur at any number of locations and as facilitated by any number of mechanisms based upon the intended application of the system 100.

Figure 3A:
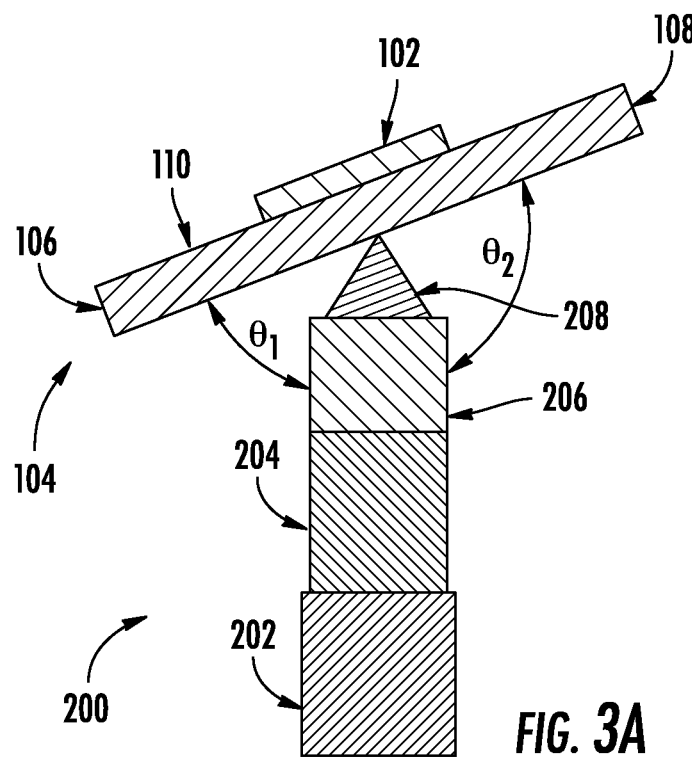
FIGS. 3A-3B illustrate side views of the example sortation device of FIG. 1 during example tilt operations in accordance with some example embodiments described herein.
Figure 3B:
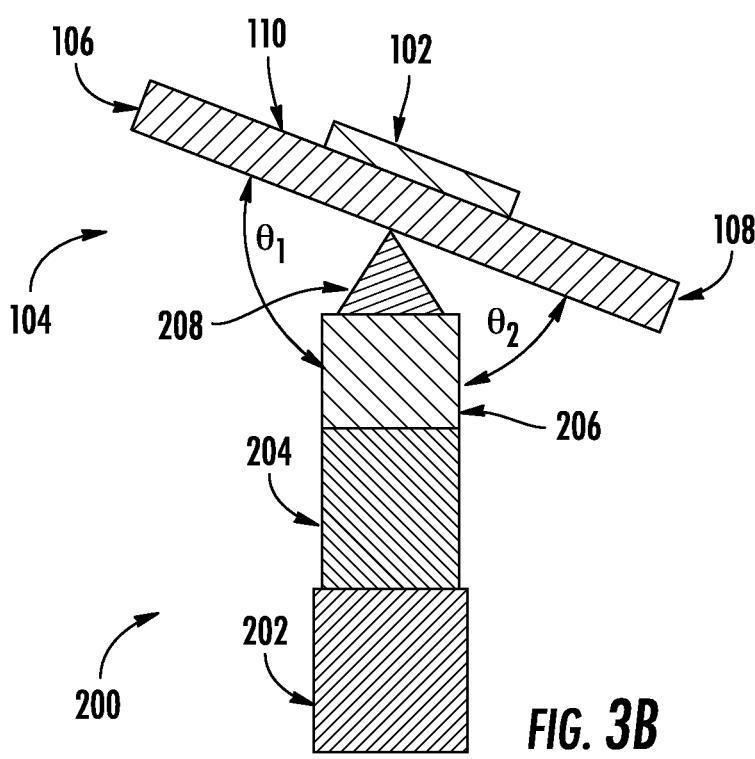

With reference to FIGS. 3A-3B, the device 100 is illustrated performing a tilt operation. As would be evident in light of the central location 112 on the body at which the sortation table 104 is pivotally attached to the adjustable frame 200, the tilt operation described herein may refer to the clockwise rotation or counterclockwise rotation of the sortation table 104 relative the adjustable frame 200. In particular, the sortation table 104 may be configured to transfer the article 102 to one or more chutes, conveyors, etc. located proximate the first end 106 by a tilt operation in the first direction (e.g., a counterclockwise rotation). For example, the sortation table 104 may rotate about the pivotal attachment (e.g., at location 112) between the sortation table 104 and the adjustable frame 200 in a first direction (e.g., counterclockwise direction) such that an angle $\theta_1$ between the first end 106 and the adjustable frame 200 decreases and an angle $\theta_2$ between the second end 108 and the adjustable frame 200 increases. In doing so, the article 102 supported by the first surface 100 of the sortation table 104 may translate relative the sortation table 104 and be transferred towards the first end 106 (e.g., into a chute positioned proximate the first end 106 as described hereafter). Such a tilt operation may similarly occur for a plurality of articles (e.g., in combination, simultaneously, etc.).

Additionally or alternatively, the sortation table 104 may be configured to transfer the article 102 to one or more chutes, conveyors, etc. located proximate the second end 108 by a tilt operation in the second direction (e.g., a clockwise rotation). For example, the sortation table 104 may rotate about the pivotal attachment (e.g., at location 112) between the sortation table 104 and the adjustable frame 200 in a second direction (e.g., clockwise direction) such that an angle $\theta_1$ between the first end 106 and the adjustable frame 200 increases and an angle $\theta_2$ between the second end 108 and the adjustable frame 200 decreases. In doing so, the article 102 supported by the first surface 100 of the sortation table 104 may translate relative the sortation table 104 and be transferred towards the second end 108 (e.g., into a chute positioned proximate the second end 108 as described hereafter). Such a tilt operation may similarly occur for a plurality of articles (e.g., in combination, simultaneously, etc.).

Figure 4A:
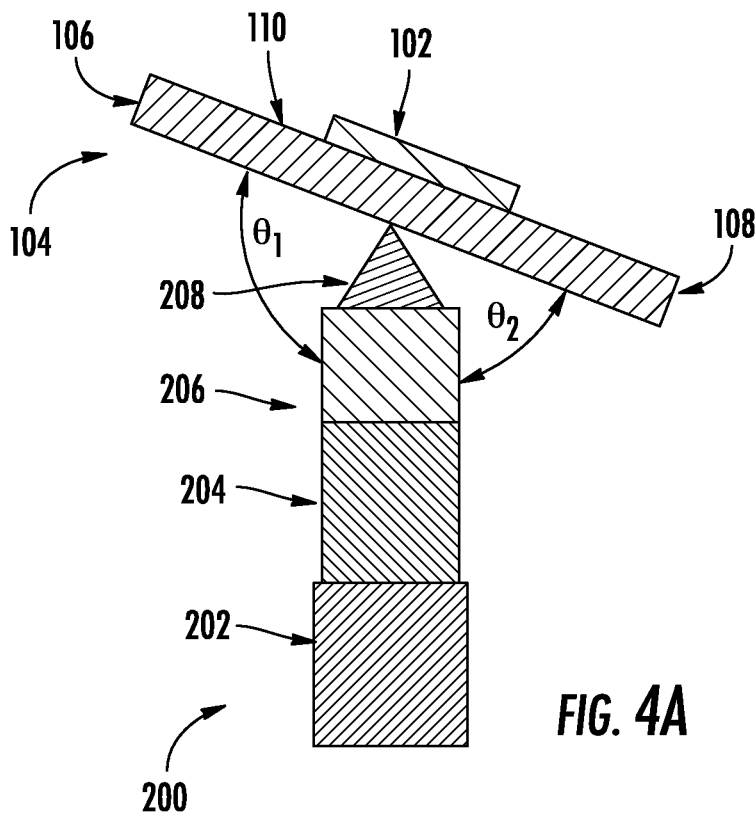
FIGS. 4A-4B illustrate side views of the example sortation device of FIG. 1 during a tilt operation in which the tilt angle varies in accordance with some example embodiments described herein.
Figure 4B:
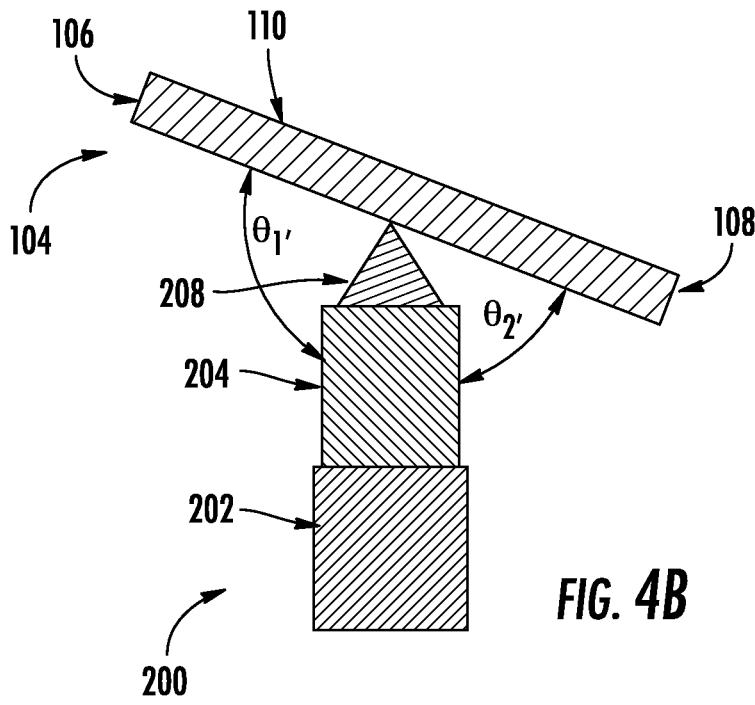

As described hereafter with reference to FIGS. 7-10, the sortation device 100 may be positioned proximate a plurality of chutes, conveyors, etc. configured to receive articles transferred by the sortation device 100, and these chutes may be located a different vertical positions (e.g., a different heights). As such, the adjustable frame 200 may operate to adjust the vertical position of the sortation table 104 so as to modify the vertical position at which the article 102 is conveyed or transferred by the sortation table. In order to ensure that the article 102 is properly conveyed to the appropriate chute, the angle between the first end 106 and the adjustable frame 200 and/or the angle between the second end 108 and the adjustable frame 200 may be modified. As shown in FIG. 4A, for example, the rotation mechanism 208 may cause the sortation table 104 to rotate about the location 112 of the body in a second direction such that the angle $\theta_1$ between the first end 106 and the adjustable frame 200 increases and the angle $\theta_2$ between the second end 108 and the adjustable frame 200 decreases. In other words, the angle $\theta_2$ may be configured to convey the article 102 from the sortation table to a chute at vertical position associated with the angle $\theta_2$ (e.g., a position at which the article 102 may be properly conveyed). Thereafter, the sortation table 104 may operate to convey or transfer another article to a chute at, for example, another vertical location that differs from the vertical location of the other chute(s). In such an example, the rotation mechanism 208 may cause the sortation table 104 to rotate about the location 112 of the body in a first direction such that the angle $\theta_1$ between the first end 106 and the adjustable frame 200 decreases to $\theta_1'$ and the angle $\theta_2$ between the second end 108 and the adjustable frame 200 increases to $\theta_2'$.

Figure 5:
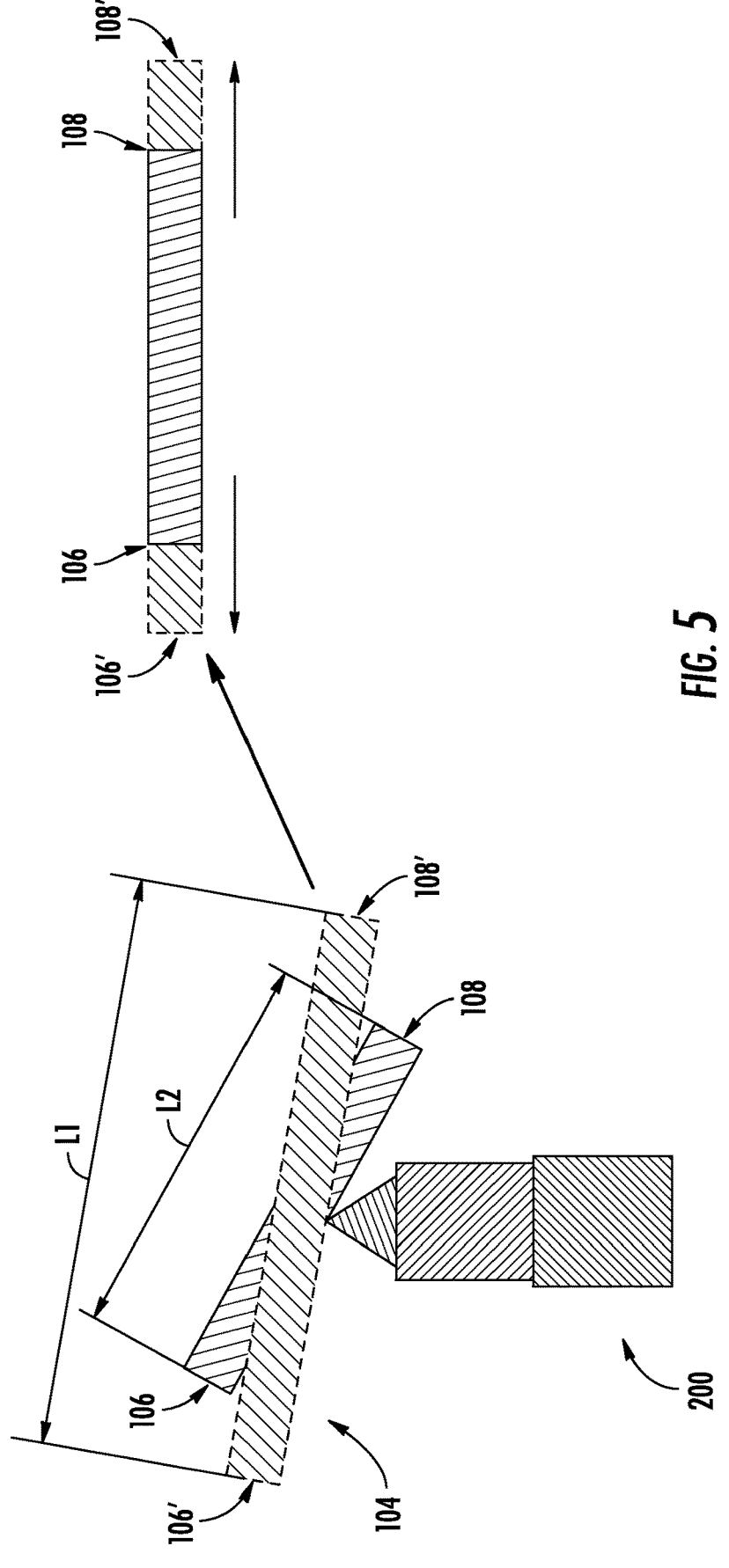
FIG. 5 illustrates an example sortation device having variable dimensions in accordance with some example embodiments described herein.

With reference to FIG. 5, in some embodiments, at least a portion of the first end 106 or the second end 108 is configured to move between an extended position and a retracted position so as to modify a length of the body measured between the first end 106 and the second end 108. By way of example, the relative position between the sortation device 100 and the plurality of chutes, conveyors, etc. may vary in that some chutes are closer in distance to the sortation device 100 than others. In order to ensure that the article 102 is properly conveyed to the appropriate chute, the sortation device 100 may employ a sortation table 104 that is variable in dimension (e.g., length). In operation, the adjustable frame 200 may adjust (e.g., increase or decrease) the vertical position of the sortation table 104 as described above. Simultaneously or in a defined sequence, the sortation table may perform a tilt operation in which the sortation table 104 is rotated about the adjustable frame 200 in either a first or a second direction as described above. In the embodiment of FIG. 5, the sortation table 104 may be configured to retract or extend such that the first end 106 extends to an example position 106', and/or the sortation table 104 may be configured to retract or extend such that the second end 108 extends to an example position 108'. Said differently, the sortation table 104 may, at a first time, have a length $L_2$ as measured between the first end 106 and the second end 108. In order to properly convey the article 102, the sortation table 104 may extend such that a length $L_1$ is defined between the first end 106' and the second end 108'. Although described herein with reference to an extendable/retractable sortation table 104, the present disclosure contemplates that any dimension of the sortation table 104 may be modified based upon the intended application of the sortation table 104.

Figure 6:
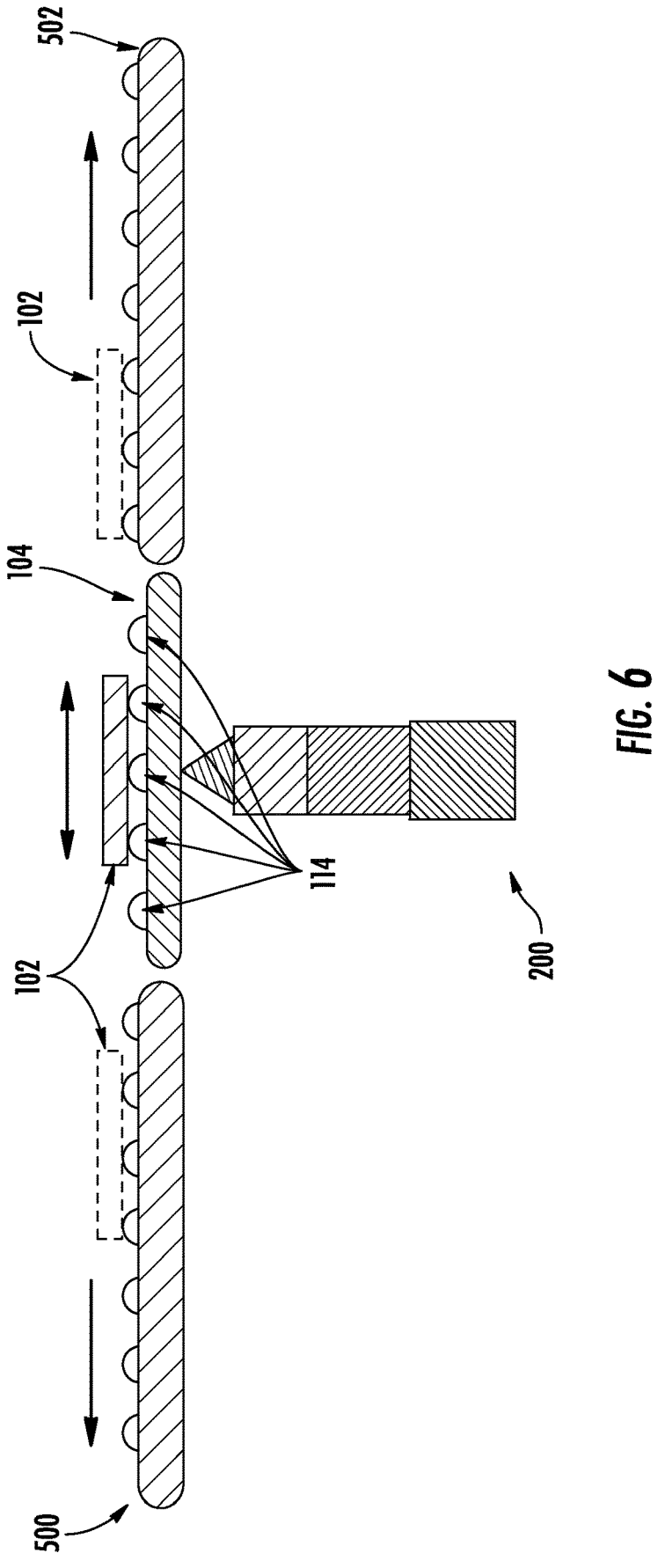
FIG. 6 illustrates a side view of the example sortation device of FIG. 1 repositioning an article with associated conveyors in accordance with some example embodiments described herein.
Figure 7:
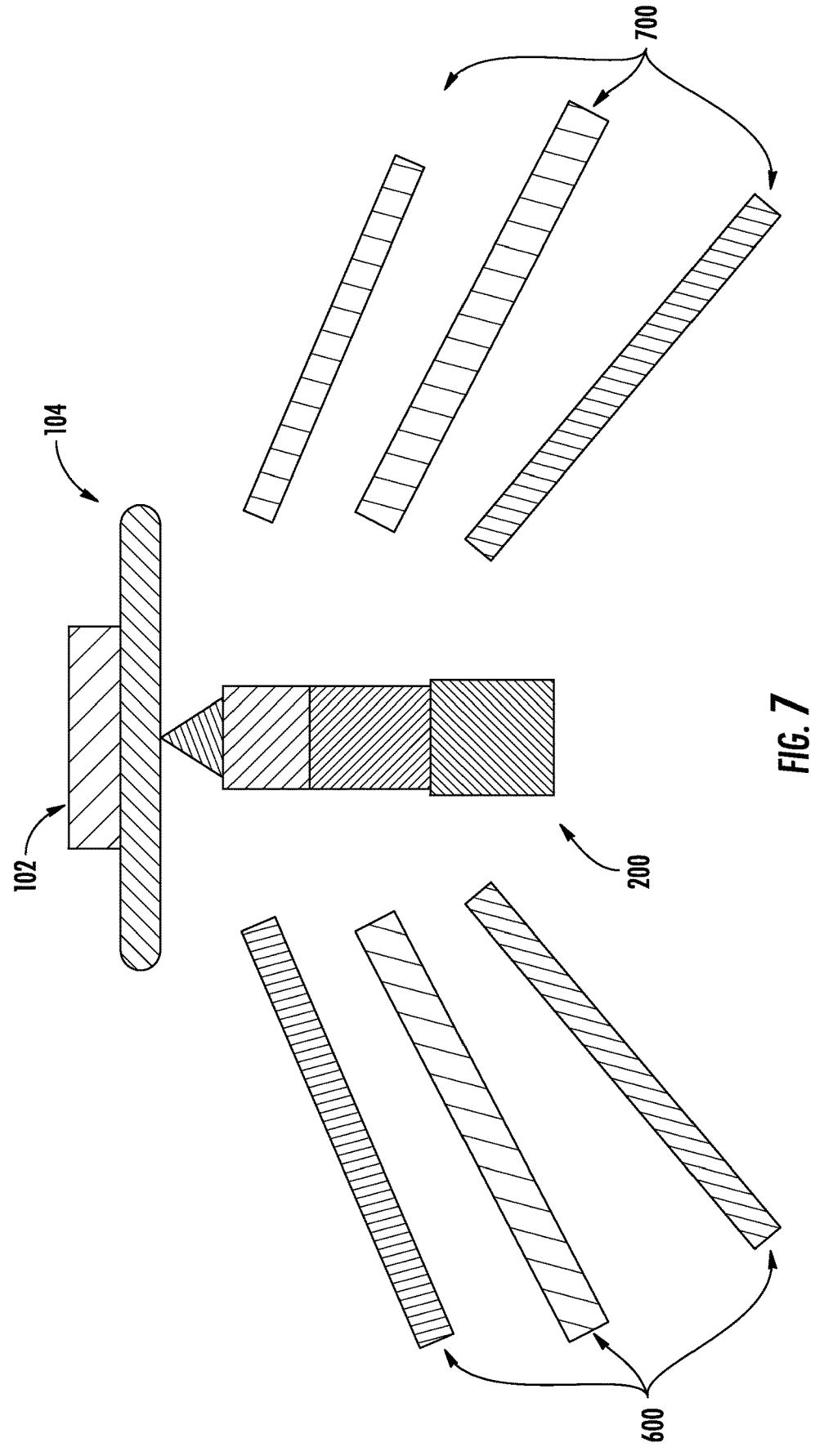
FIG. 7 illustrates the example sortation device of FIG. 1 installed as part of an example sortation system having a plurality of chutes in accordance with some example embodiments described herein.

In some embodiments, as shown in FIG. 6, the device 100 may be configured to perform diversion operations in which the position of an article 102 supported by the sortation table 104 is changed. For example, the sortation table 104 may include one or more rollers 114 supported by the body of the sortation table 104. The one or more rollers 114 may be configured to translate the first article 102 relative the first surface 110 of the body. The one or more rollers 114 may be operably connected with a motor (not shown) and/or the controller 300 so as to receive instructions from the controller 300 regarding the diversion operation associated with the article 102. For example, the motor (not shown) may receive instructions from the controller 300 that cause rotation of the one or more rollers 114 to cause translation of the article 102 relative the sortation table 104 for receipt by a corresponding first conveyor 500 or a second conveyor 502. In some embodiments, the one or more rollers 114 may be pop-up rollers in that the one or more rollers 114 may move between a retracted position and an extended position. For example, the one or more rollers 114 may move between a retracted position in which the one or more rollers 114 are at least partially stored within the body of the sortation table 104 and an extended position wherein at least a portion of the one or more rollers 114 extend beyond the first surface 110 of the body so as to contact the article 102 supported thereon. Additionally or alternatively, the first conveyor 500 and/or the second conveyor 502 may similarly include rollers configured to convey the article 102 to the sortation table 104.

With reference to FIGS. 7-10, sortation device 100 is illustrated schematically with one or more chutes of an example material handling environment or sortation system. As shown, the first end 106 of the sortation table 104 may be operably coupled with a plurality of chutes 600 located proximate the first end 106 so as to receive articles from the sortation device 100 via a tilt operation that rotates in the first direction as described above. Similarly, the second end 108 of the sortation table 104 may be operably coupled with a plurality of chutes 700 located proximate the second end 108 so as to receive articles from the sortation device 100 via a tilt operation that rotates in the second direction as described above. Although illustrated with a plurality of chutes 600 located proximate the first end 106 having three (3) chutes and a plurality of chutes 700 located proximate the second end 108 having three (3) chutes, the present disclosure contemplates that the sortation device 100 may be configured for use with any number of chutes 600, 700 at any number of corresponding locations. Given the vertical adjustment provided by the adjustment frame 200 described above, the sortation device 100 may be configured for use with any number of vertically stacked, grouped, aligned, etc. chutes 600, 700.

Figure 8:
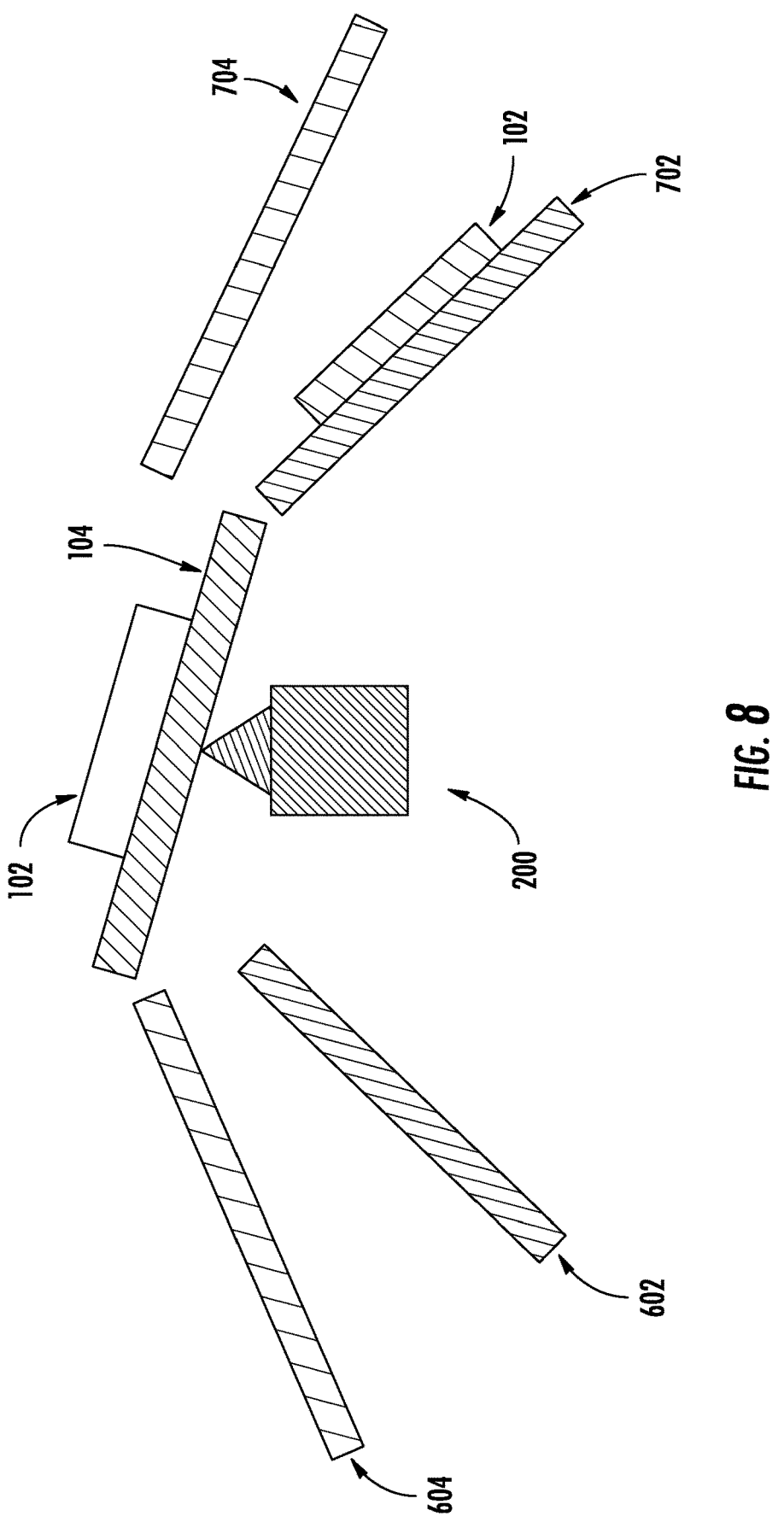
FIGS. 8-9 illustrate example tilt operations of the example sortation device of FIG. 7 in accordance with some example embodiments described herein.
Figure 9:
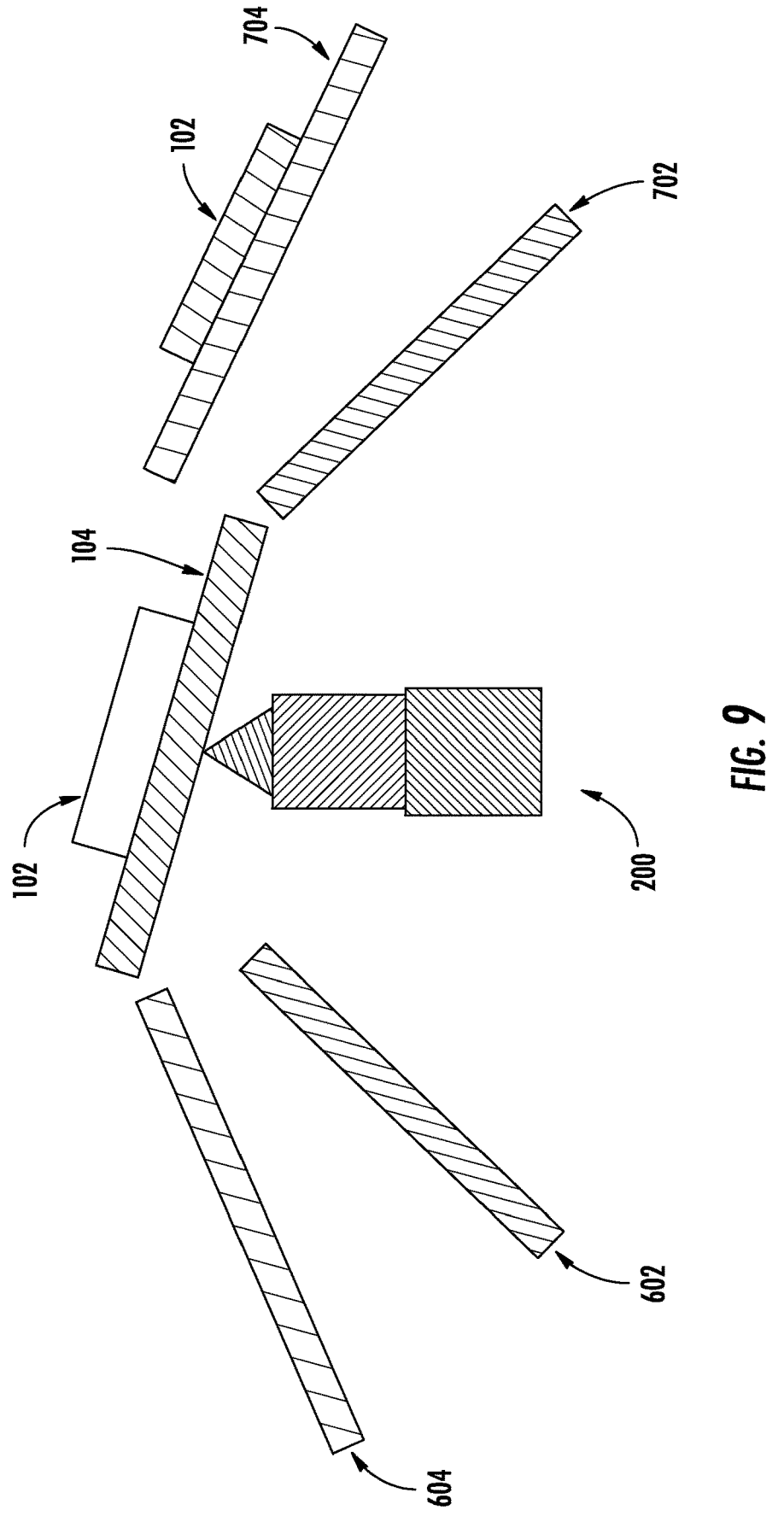

For example, and as shown in FIGS. 8-9, the sortation device 100 may be operably coupled with a first chute 602 proximate the adjustable frame 200 and the first end 106 of the sortation table 104 located at a first vertical position and a second chute 604 proximate the adjustable frame 200 and the first end 106 of the sortation table 104 located at a second vertical position. Similarly, the adjustable frame 200 may be configured to be operably coupled with a third chute 702 proximate the adjustable frame 200 and the second end 108 of the sortation table 104 located at a third vertical position and a fourth chute 704 proximate the adjustable frame 200 and the second end 108 of the sortation table 104 located at a fourth vertical position. As shown in FIG. 8, the adjustable frame 200 may move the sortation table 104 vertically so as to provide the article 102 to the third chute 702 via the tilt operation (e.g., rotation of the sortation table in the second, clockwise direction). Additionally or alternatively, as shown in FIG. 9, the adjustable frame 200 may be configured to move the sortation table 104 vertically so as to provide the article 102 to the fourth chute via the tilt operation (e.g., rotation of the sortation table in the second, clockwise direction). As would be evident in light of the differing vertical positions of the third chute 702 and the fourth chute 704, the angle at which the tilt operation occurs may vary as described above. For example, the tilt operation in which the sortation table 104 rotates about the pivotal attachment between the sortation table 104 and the adjustable frame 200 is in a second direction may be such that a first angle between the second end and the adjustable frame 200 is formed so as to provide the article 102 to the third chute via the tilt operation and/or a second angle between the second end 108 and the adjustable frame 200 is formed so as to provide the article 102 to the fourth chute 704 via the tilt operation.

Although described and illustrated with reference to a tilt operation in the second direction, the present disclosure contemplates that a tilt operation in the first operation would occur in substantially the same manner. For example, the adjustable frame 200 may be configured to move the sortation table 104 vertically so as to provide the article 102 to the first chute 602 via the tilt operation at the first vertical position (e.g., rotation of the sortation table in the first, counterclockwise direction). The adjustable frame 200 may also be configured to move the sortation table 204 vertically so as to provide the article 102 to the second chute 602 via the tilt operation (e.g., rotation of the sortation table in the first, counterclockwise direction). The tilt operation in which the sortation table 104 rotates about the pivotal attachment between the sortation table 104 and the adjustable frame 200 in the first direction may be such that a first angle between the first end 106 and the adjustable frame 200 is formed so as to provide the article 102 to the first chute 602 via the tilt operation. Similarly, a second angle between the first end 106 and the adjustable frame 200 may be formed so as to provide the article 102 to the second chute 604 via the tilt operation (e.g., rotation of the sortation table in the first, counterclockwise direction).

Figure 10:
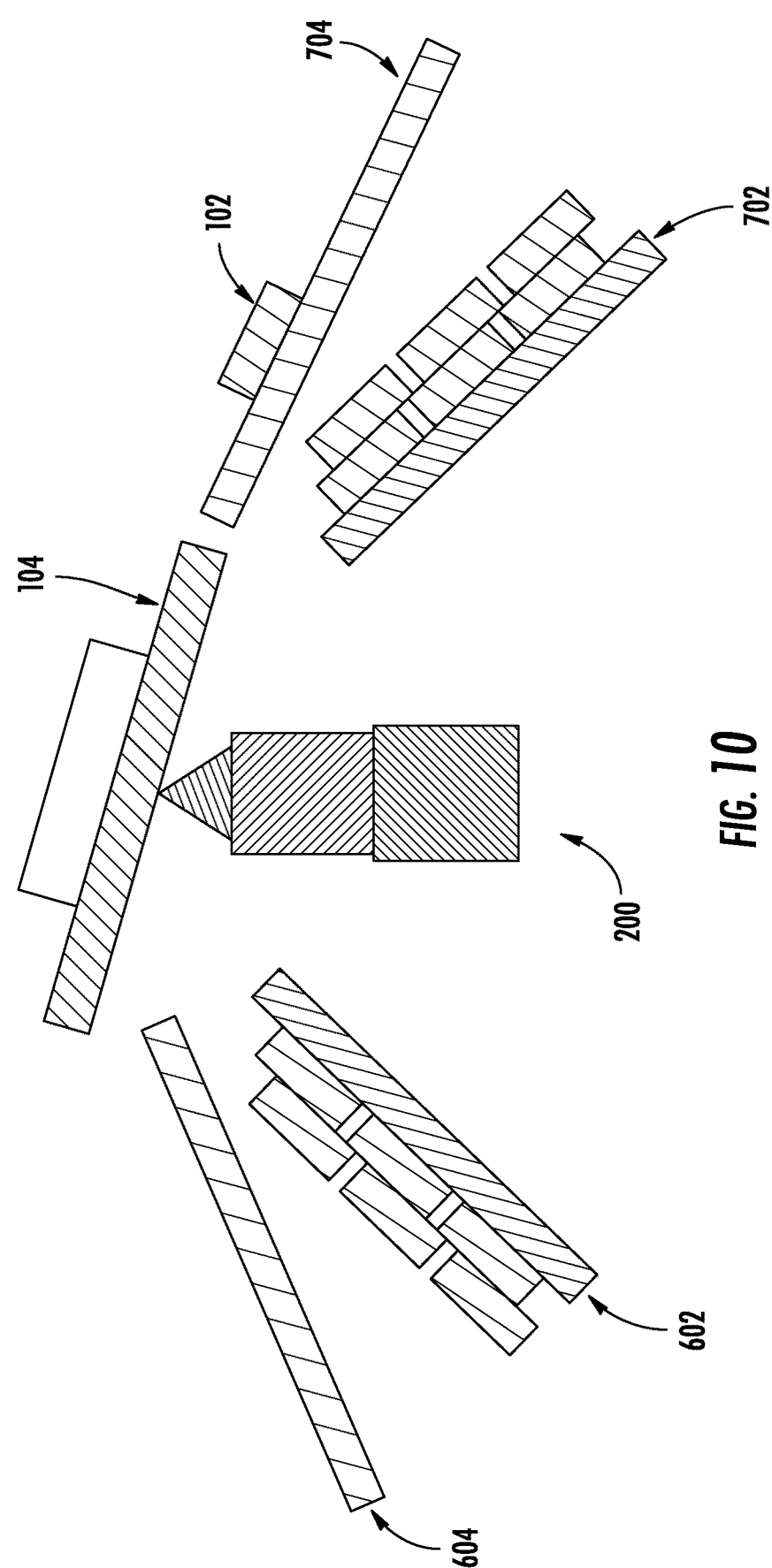
FIG. 10 illustrates an example tilt operation of the example sortation device of FIG. 7 responsive to one or more characteristics of the article in accordance with some example embodiments described herein.

With reference to FIG. 10, in some embodiments, the controller 300 may be further configured to control the tilt operation of the sortation table 104 based upon one or more characteristics of the article 102. As shown, in some instances, one or more chutes may be determined by the controller 300 to be full (e.g., incapable of receiving the article 102). For example, the one or more sensors 400 may include one or more cameras, scanners, or the like configured to generate data indicative of number of articles located in a particular location (e.g., in a particular chute 602, 604, 702, 704). In response, the controller 300 may transmit instructions to the sortation device 100 that causes the adjustable frame 200 and/or the sortation table 104 to modify the vertical position or angle, respectively of the sortation table 104 so as to divert the article 102 to a chute capable of receiving the article 102. Although described herein with reference to an example article characteristic regarding chute density or throughput, the present disclosure contemplates that the controller 300 may account for any characteristic (e.g., size, dimension, orientation, contents, etc.) of the article 102 as well as any parameter (e.g., speed, size, etc.) of the chutes in controlling the sortation device 100.

The embodiments described herein may also be scalable to accommodate at least the aforementioned applications. Various components of embodiments described herein can be added, removed, reorganized, modified, duplicated, and/or the like as one skilled in the art would find convenient and/or necessary to implement a particular application in conjunction with the teachings of the present disclosure. Moreover, specialized features, characteristics, materials, components, and/or equipment may be applied in conjunction with the teachings of the present disclosure as one skilled in the art would find convenient and/or necessary to implement a particular application in light of the present disclosure.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated, in light of the present disclosure, that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. A sortation device comprising:
a height adjustable frame; and
a sortation table movably attached to the height adjustable frame, the sortation table defining:
a first end;
a second end opposite the first end;
a body extending therebetween, the body defining a first surface configured to support an article thereon, wherein a location of the body between the first end and the second end is configured to pivotally attach the sortation table with the height adjustable frame, wherein at least a portion of the first end or the second end is configured to move between an extended position and a retracted position so as to modify a length of the body measured between the first end and the second end; and
a controller operably coupled with the height adjustable frame, wherein the controller is configured to:
receive data from one or more sensors pertaining to one or more characteristics of the article;
identify a chute of one or more chutes capable of receiving the article based on the data from the one or more sensors; and
control a vertical movement of the height adjustable frame and a tilt operation of the sortation table for conveying the article to the identified chute based upon the one or more characteristics of the article.

2. The sortation device according to claim 1, wherein the location of the body at which the sortation table is pivotally attached to the height adjustable frame is:
substantially equidistance from the first end and the second end; or
supported by a hinge mechanism defining a plurality of linkages configured to facilitate the rotation of the sortation table about the height adjustable frame.

3. The sortation device according to claim 1, wherein the tilt operation in which the sortation table rotates about the pivotal attachment between the sortation table and the height adjustable frame is in a first direction such that an angle between the first end and the height adjustable frame decreases and an angle between the second end and the height adjustable frame increases.

4. The sortation device according to claim 1, wherein the tilt operation in which the sortation table rotates about the pivotal attachment between the sortation table and the height adjustable frame is in a second direction such that an angle between the first end and the height adjustable frame increases and an angle between the second end and the height adjustable frame decreases.

5. The sortation device according to claim 1, further comprising a rotation mechanism operably coupled with the sortation table and configured to cause rotation of the sortation table about the pivotal attachment with the height adjustable frame so as to perform the tilt operation.

6. The sortation device according to claim 1, further comprising one or more rollers supported by the body of the sortation table, the one or more rollers configured to translate the article relative the first surface of the body.

7. The sortation device according to claim 6, wherein the one or more rollers are configured to move between:
a retracted position in which the one or more rollers are at least partially stored within the body of the sortation table; and
an extended position wherein at least a portion of the one or more rollers extends beyond the first surface of the body so as to contact the article supported thereon.

8. The sortation device according to claim 6, further comprising one or more conveyors coupled with the first surface of the body, the one or more conveyors configured to receive the article translated by the one or more rollers.

9. The sortation device according to claim 1, wherein the height adjustable frame is configured to be operably coupled with a first chute proximate the height adjustable frame and the first end of the sortation table, the first chute located at a first vertical position, wherein the height adjustable frame is configured to move the sortation table vertically so as to provide the article to the first chute via the tilt operation at the first vertical position.

10. The sortation device according to claim 9, wherein the tilt operation in which the sortation table rotates about the pivotal attachment between the sortation table and the height adjustable frame is in a first direction such that a first angle between the first end and the height adjustable frame decreases.

11. The sortation device according to claim 1, wherein the height adjustable frame is configured to be operably coupled with:
a first chute proximate the height adjustable frame and the first end of the sortation table located at a first vertical position; and
a second chute proximate the height adjustable frame and the first end of the sortation table located at a second vertical position,
wherein the height adjustable frame is configured to move the sortation table vertically so as to provide the article to either the first chute or the second chute via the tilt operation.

12. The sortation device according to claim 11, wherein the tilt operation in which the sortation table rotates about the pivotal attachment between the sortation table and the height adjustable frame is in a first direction such that:
a first angle between the first end and the height adjustable frame is formed so as to provide the article to the first chute via the tilt operation; or
a second angle between the first end and the height adjustable frame is formed so as to provide the article to the second chute via the tilt operation.

13. The sortation device according to claim 11, wherein at least a portion of the first end or the second end is configured to move between an extended position and a retracted position so as to modify a length of the body measured between the first end and the second end so as to provide the article to either the first chute or the second chute.

14. The sortation device according to claim 11, wherein the height adjustable frame is further configured to be operably coupled with:

a third chute proximate the height adjustable frame and the second end of the sortation table located at a third vertical position; and a fourth chute proximate the height adjustable frame and the second end of the sortation table located at a fourth vertical position, wherein the height adjustable frame is configured to move the sortation table vertically so as to provide the article to either the third chute or the fourth chute via the tilt operation.

15. The sortation device according to claim 1, wherein the height adjustable frame comprises a plurality of sequentially nested sections.

16. The sortation device according to claim 1, wherein the height adjustable frame comprises a hydraulic, a pneumatic, or an electric drive mechanism configured to cause vertical movement of the height adjustable frame.

17. The sortation device according to claim 1, wherein the sortation table is configured to, following performance of a tilt operation, revert to a resting position that is substantially perpendicular with respect to vertical movement of the height adjustable frame.

* * * * *